United States Patent

Seki et al.

[11] Patent Number: 5,910,230
[45] Date of Patent: Jun. 8, 1999

[54] STUCK SHEET MATERIAL MANUFACTURING SYSTEM EQUIPPED WITH PRESSURE DEVICE

[75] Inventors: Yukuharu Seki; Toshihide Kato, both of Hiroshima-ken, Japan

[73] Assignee: Mitsubishi Heavy Industries, LTD., Japan

[21] Appl. No.: 08/870,235

[22] Filed: Jun. 6, 1997

[30] Foreign Application Priority Data

Oct. 31, 1996 [JP] Japan .................................. 8-290577

[51] Int. Cl.$^6$ .................................................. B30B 5/00
[52] U.S. Cl. ...................... 156/470; 156/583.5; 425/370
[58] Field of Search .................................. 156/470, 580, 156/583.1, 583.5, 581, 582; 425/369, 370

[56] References Cited

U.S. PATENT DOCUMENTS

| | | | |
|---|---|---|---|
| 3,468,734 | 9/1969 | Shields | 156/210 |
| 3,676,268 | 7/1972 | Brandenburg | 156/548 |
| 5,456,783 | 10/1995 | Sissons | 156/210 |
| 5,466,329 | 11/1995 | Marschke | 156/470 |
| 5,526,739 | 6/1996 | Lauderbaugh | 100/48 |

FOREIGN PATENT DOCUMENTS 0623459  11/1994  European Pat. Off. .

Primary Examiner—James Sells
Attorney, Agent, or Firm—Rothwell, Figg, Ernst & Kurz, P.C.

[57] ABSTRACT

In a stuck sheet material manufacturing system for manufacturing a stuck sheet material, which has a sticking device for sticking together a front sheet member and a rear sheet member, the sticking device includes a heating member for heating a sheet member and a pressure device provided oppositely to the heating member for pressing a stuck sheet material to the heating member, and the pressure device includes a supporting member arranged so as to be extended in a horizontal direction perpendicular to a traveling direction, a plurality of weight blocks suspended from the supporting member via elastic members and arranged side by side and vertical movement driving means for driving the vertical movement of the supporting member.

10 Claims, 11 Drawing Sheets

PRESSURE DISTRIBUTION

SHEET PRESSURE WITHSTANDING CRUSHING FORCE

PRESSURE DISTRIBUTION

STUCK SHEET MATERIAL MANUFACTURING SYSTEM EQUIPPED WITH PRESSURE DEVICE

FIELD OF THE INVENTION AND RELATED ART STATEMENT

The present invention relates to a stuck sheet material manufacturing system equipped with a pressure device, which includes a sticking device for sticking together a front sheet member and a rear sheet member by applying pressure.

A stuck sheet material manufacturing device for manufacturing a stuck sheet material (stuck sheet material manufacturing system equipped with a pressure device), which includes a sticking device for sticking together a front sheet member and a rear sheet member while traveling these members, has conventionally been developed. As one of such devices, for example, a double faced corrugated fiberboard sheet manufacturing device (referred to as a corrugating machine, hereinafter) for making corrugated paper (i.e., double faced corrugated fiberboard sheet and referred to as a corrugated fiberboard or a corrugated fiberboard sheet, hereinafter) by sticking together a plurality of paper sheets has been available.

This corrugating machine includes a dry end which is composed of a single facer, a double facer, a slitter scorer cutoff stacker, and so on, a loading part and the like. In the corrugating machine, a double faced corrugated fiberboard sheet is formed by sticking together a single faced corrugated fiberboard sheet formed by the single facer (not shown) and a liner with the double facer and a divided plate-like double faced corrugated fiberboard sheet is formed by cutting this double faced corrugated fiberboard sheet with the dry end. Then, the divided plate-like double faced corrugated fiberboard sheet is carried to the loading part.

The double facer of such a corrugating machine will be described more in detail below by referring to FIG. 8 which is a typical side view showing the entire structure of the double facer provided in the corrugating machine.

As shown in the typical side view of FIG. 8, the double facer of the corrugating machine is for making a double faced corrugated fiberboard sheet (or a double wall corrugated fiberboard sheet) 1 by sticking together a single faced corrugated fiberboard sheet 22 formed with a single facer (not shown) in the upstream side (left end outer side in FIG. 8) of the double facer and glued by a gluing device 24 and a liner (liner base paper) 23 carried from a liner base paper feeding part (not shown). The double facer includes a heating part 11 and a cooling part 21. A gluing machine 32 is arranged in the upstream side of this double facer, and glue is applied to the flute tip part of the single faced corrugated fiberboard sheet 22 by the gluing device 24 of this gluing machine 32. In FIG. 8, FL represents a floor surface.

As shown in FIG. 8, the heating part 11 as one constitutional element of the double facer is for forming the double faced corrugated fiberboard sheet 1 by heating the single faced corrugated fiberboard sheet 22 and the liner 23 while applying pressure so as to adhere the sheet 22 and the liner 23 to each other. The heating part 11 includes a preheating part 25, a hot plate (heating box) 12, a pressure belt 15, a pressurizing part 26, and so on.

The preheating part 25 is for preheating and tempering the single faced corrugated fiberboard sheet 22 and the liner 23 by winding these on a roller.

The hot plate 12 is arranged in the lower side of the heating part 11 and composed of a plate-like member, which has been heated to a proper level by steam.

The pressure belt (endless pressure belt) 15 is arranged in the upper side of the heating part 11 and applies pressure while carrying the single faced corrugated fiberboard sheet 22 and the liner 23 (i.e., the double faced corrugated fiberboard sheet 1).

The pressurizing part 26 employs an air pressurizing system as shown in the typical front view of FIG. 9. Being composed of a blower 29 as a compressed air supply source, a compressed air supply pipe 30, an air chamber 31, and so on, the pressurizing part 26 pressurizes the back surface of the pressure belt 15 from an arrow direction by compressed air (A), which is sent from the blower 29 through the supply pipe 30 into the air chamber 31, and generates a pressing force necessary for sticking together of the single faced corrugated fiberboard sheet 22 and the liner 23.

Next, the cooling part 21 as another constitutional element of the double facer will be described.

As shown in FIG. 8, the cooling part 21 has a function for cooling the double faced corrugated fiberboard sheet 1 made by the heating part 11 so as to further ensure a sticking condition between the single faced corrugated fiberboard sheet 22 and the liner 23 and correcting distortion or warp of the double faced corrugated fiberboard sheet 1 during the cooling process. This cooling part 21 includes a carrier belt 27, a pressure belt 15, a pressurizing part 28, and so on. The double faced corrugated fiberboard sheet 1 is carried while being held between the carrier belt 27 arranged in the lower side of the cooling part 21 and the pressure belt 15 arranged in the upper side of the same and then pressurized by the pressurizing part 28. The pressurizing part 28 includes a plurality of rollers which are spaced and pressurizes the back surface of the pressure belt 15.

The operation of the double facer of the corrugating machine constructed in the above-described manner is as follows.

Glue is applied by the gluing device 24 of the gluing machine 32 to the flute tip part of the single faced corrugated fiberboard sheet 22 formed with the single facer (not shown). Then, together with the liner 23 which has been preheated and tempered by the preheating part 25, the sheet 22 is carried in between the hot plate 12 heated to a proper level by steam and the pressure belt 15.

Then, the single faced corrugated fiberboard sheet 22 and the liner 23 are carried together in a laminated condition while being held between the pressure belt 15 and the hot plate 12. A proper pressing force is then applied to each of the single faced corrugated fiberboard sheet 22 and the liner 23 by the pressurizing part 26. The sheet 22 and the liner 23 are heated by the hot plate 12 and thereby stuck together. In this way, the double faced corrugated fiberboard sheet 1 is formed.

The double faced corrugated fiberboard sheet 1 formed in such a manner is carried to the cooling part 21 so as to be subjected to a cooling process, and then carried while being held between the pressure belt 15 and the carrier belt 27. A proper pressing force is then applied to the double faced corrugated fiberboard sheet 1 by the pressurizing part 28. In this way, the sticking condition between the single faced corrugated fiberboard sheet 22 and the liner 23 which have been adhered to each other by the heating part 11 is further ensured and distortion or warp produced during cooling is corrected.

In the heating part 11 of the double facer, in order to surely stick together the single faced corrugated fiberboard 22 and the liner 23 which are traveled by being slid and brought into contact with the hot plate 12, the sheet 22 and the liner 23 must be heated to an optimal temperature and an optimal pressing force must be uniformly applied over the entire region of a sheet breadth direction.

Accordingly, various technologies have been presented so as to provide pressure devices for the double facer.

For example, a weight roll system pressure device has been presented, wherein plural groups of rolls put up in the breadth direction of the double faced corrugated fiberboard sheet 1 are arranged side by side along a traveling direction and the double faced corrugated fiberboard sheet 1 is pressed to the hot plate 12 via the pressure belt 15. In this pressure device, however, since a pressing force cannot be uniformly applied on the full surface of the double faced corrugated fiberboard sheet 1, it is difficult to improve the quality of the double faced corrugated fiberboard sheet 1.

To take another example from the prior art, a pressure device which employs the above-noted air pressurizing system has been presented. Referring to FIG. 9, there is shown such a device, wherein plural groups of air chambers 31 are arranged side by side along the traveling direction of the double faced corrugated fiberboard sheet 1 and the sheet 1 is pressed to the hot plate 12 via the pressure belt 15. The pressure device includes a blower 29 as a supply source for compressed air (A), a supply pipe 30 for the compressed air (A), an air chamber 31, and so on. The back surface of the pressure belt 15 is heated from an arrow direction by the compressed air (A) which is sent from the blower 29 through the supply pipe 30 into the air chamber 31 and then a pressing force necessary for sticking together the single faced corrugated fiberboard sheet 22 and the liner 23 is generated.

Such an air chamber 31 has side walls in both sides having a space corresponding to the maximum breadth of the double faced corrugated fiberboard sheet 1 (i.e., a space larger than the maximum breadth of the double faced corrugated fiberboard sheet 1). The lower end of each side wall is slid and brought into direct contact with the back surface of the pressure belt 15. A pressurizing force by the compressed air (A) supplied into this air chamber 31 is directly applied to the back surface of the pressure belt 15 and thereby the double faced corrugated fiberboard sheet 1 is pressurized.

Referring now to FIG. 10(*a*), there is shown pressure (P) distribution in the air chamber 31. The pressure distribution is approximately uniform in the breadth direction as a pressurizing box inner side width Wc. Accordingly, when the double faced corrugated fiberboard sheet 1 having a breadth smaller in dimension than the space of both side walls of the air chamber 31 is carried, air pressure is also applied via the pressure belt 15 to a region in which the double faced corrugated fiberboard sheet 1 does not exist (portion located in the outer side more than both side parts of the double faced corrugated fiberboard sheet 1). This application of air pressure causes the side part of the pressure belt 15 to be bent downward and deformed. As shown in FIG. 10(*b*), the pressure withstanding crushing force of the double faced corrugated fiberboard sheet 1 is lower in its side part.

Consequently, both side parts of the double faced corrugated fiberboard sheet 1 may be crushed (slack condition).

As shown in FIG. 10(*c*), a gap (e) is formed between the side wall lower end of the air chamber 31 and the pressure belt 15 bent downward and deformed because of the action of the compressed air (A) pressure and air leakage is increased through this gap (e). For this reason, it is difficult to generate a pressing force having high pressure and uniform in the breadth direction and impossible to increase productivity. The level of energy loss caused by the air leakage cannot be ignored, either.

Referring now to FIG. 11, there is shown a plate pressurizing system pressure device, wherein a plurality of plates 33 are arranged side by side in the upper side of the pressure belt 15 along the breadth direction of the double faced corrugated fiberboard sheet 1 and the sheet 1 is pressed to the hot plate 12 by applying a pressing force generated by a compression spring 34 or an air cylinder to the sheet 1 via the pressure belt 15. Such a plate pressurizing system pressure device is disclosed in, for example, Japanese Patent Provisional Publication No. 6-328596.

This plate pressurizing system pressure device applies, as shown in FIG. 11, a spring force generated by the compression spring 34 to the back surface of the pressure belt 15 via the plate 33 and presses the double faced corrugated fiberboard sheet 1. Specifically, the pressure device includes a beam 35 arranged in the upper side of the hot plate 12, pup up in the breadth direction of the double faced corrugated fiberboard sheet 1 and formed in a channel shape, a plate 33 suspended from the bottom surface of the beam 35 via four links 36 (FIG. 11 shows only two) so as to be swung and a compression spring 34 provided between the beam 35 and the plate 33. In such a pressure device, movement in the traveling direction of the double faced corrugated fiberboard sheet 1 can be regulated by the four links 36 and the corrugated fiberboard sheet 1 can be pressurized by the spring force of the compression spring 34 via the plate 33 and the pressure belt 15.

A plurality of plates 33 are provided in the breadth direction of the double faced corrugated fiberboard sheet 1. These plates 33 are arranged side by side over the entire breadth direction of the hot plate 12 without any spaces. The bottom surface of each plate 33 can apply the spring force of the compression spring 34 to the upper side surface (back surface) of the pressure belt 15.

The four links 36 which suspend the plates 33 are connected to one another and constructed so as to be swung in synchronization and by the same angle. Accordingly, each of the plate 33 is raised and lowered while maintaining its horizontal condition without changing its inclination.

However, for the hot plate with which the bottom surface of the double faced corrugated fiberboard sheet 1 is brought into contact in a sliding manner, fluctuation occurs in the amount of heat radiation from the surface because of the breadth dimension of the double faced corrugated fiberboard sheet 1, the traveling speed of the sheet 1, the temperature of the sheet 1 and other various factors. Accordingly, in the hot plate 12 arranged in parallel with the advancing direction of the double faced corrugated fiberboard sheet 1, there may be a great difference in the level of expansion or deformation caused by contraction between upstream and downstream sides.

In addition, a pressing force must be properly adjusted according to corrugated fiberboard base paper, in other words core paper, liner material quality and other various factors. For example, if a pressing force is increased for base paper having low rigidity, the chevron flute tip part of the core paper is crushed. On the other hand, if a low pressing force is set for highly rigid base paper, since sticking is not ensured, a pressing force to be applied must be properly adjusted.

Furthermore, as shown in FIG. 12(*b*), if the hot plate 12 is recessed (or projected) in the center of its breadth direction, since the width of each of the plurality of plates 33 arranged in the breadth direction of the hot plate 12 is wide and the plate 33 is raised and lowered while maintaining its horizontal direction, the pressing force of the plate 33 is only applied to one side of the breadth direction of the double faced corrugated fiberboard sheet 1. Consequently, as shown in FIG. 12(a), a difference in the strength of a pressing force (irregularity of a pressing force) may occur in the breadth Ws direction of the double corrugated fiberboard sheet 1.

As apparent from the foregoing, there is a problem inherent in this pressure device. Specifically, since the full surface of the double faced corrugated fiberboard sheet 1 cannot be uniformly pressed to the hot plate 12 (in particular, if the upper surface of the hot plate 12 is bent, the double faced corrugated fiberboard sheet 1 cannot be uniformly pressed), it is impossible to uniformly stick together the single faced corrugated fiberboard 22 and the liner 23.

Another problem inherent in such a pressure device is that since the increase/decrease of a pressing force must be adjusted according to base paper material quality and other factors, it is difficult to set the device to an optimal pressurizing condition.

OBJECT AND SUMMARY OF THE INVENTION

It is an object of the present invention made with foregoing problems in mind to provide a stuck sheet material manufacturing system equipped with a pressure device, which is capable of uniformly and surely pressurizing a stuck sheet material and adjusting a pressurizing force.

In order to achieve the object, according to claim 1 of the present invention, a stuck sheet material manufacturing system equipped with a pressure device for manufacturing a stuck sheet material includes a sticking device for sticking together a front sheet member and a back sheet member while traveling these members, wherein the sticking device includes a heating member for heating the sheet members while being in contact with the front or back surface of the stuck sheet material and a pressure device provided oppositely to the heating member for pressing the stuck sheet material to the heating member and the pressure device includes a supporting member arranged so as to be extended in a horizontal direction perpendicular to a traveling direction, a plurality of weight blocks suspended from the supporting member via elastic members and arranged side by side and vertical movement driving means for raising/lowering the supporting member.

Each of the plurality of weight blocks suspended from the supporting member via elastic members and arranged side by side applies a force of a vertical direction generated by its dead weight to the stuck sheet material which is traveled in contact with the heating member. This force causes the stuck sheet material to be pressed to the heating member and heated. In this case, by vertically moving the supporting member from which the plurality of weight blocks are suspended with the vertical movement driving means, pressing forces applied to the stuck sheet material by the plurality of weight blocks are adjusted. In other words, if the supporting member is raised, a suspending force applied to the weight block by the elastic member is increased and a pressing force applied to the stuck sheet material by the weight block is decreased by a corresponding amount. Conversely, if the supporting member is lowered, a suspending force applied to the weight block by the elastic member is decreased and a pressing force applied to the stuck sheet material by the weight block is increased.

As obvious from the foregoing detailed description, the stuck sheet material manufacturing system equipped with the pressure device specified in claim 1 of the present invention is advantageous in that the stuck sheet material can be surely pressurized by using the dead weight of each of the plurality of weight blocks. The system is also advantageous in that since the plurality of weight blocks can be optionally positioned in a vertical direction by vertically moving the supporting member having the plurality of weight blocks suspended therefrom, the increase/decrease of an elastic force generated by the elastic member which suspends the weight block is adjusted and thereby the increase/decrease of a pressing force generated by the dead weight of the weight block can be adjusted.

According to claim 2 of the present invention, the stuck sheet material manufacturing system as specified in claim 1 is characterized in that the sticking device includes a double facer for forming a double faced corrugated fiberboard sheet as the stuck sheet material.

Each of the plurality of weight blocks suspended via the elastic members and arranged side by side from the supporting member provided in the double facer for making a doube faced corrugated fiberboard sheet while traveling sheet materials (front and back sheet members) applies a force of a vertical direction generated by its dead weight to the double faced corrugated fiberboard sheet which is traveled in contact with the heating member. This force causes the double faced corrugated fiberboard sheet to be pressed to the heating member and heated. In this case, by vertically moving the supporting member from which the plurality of weight blocks are suspended with the vertical movement driving means, a pressing force applied to the double faced corrugated fiberboard sheet by each of the plurality of weight blocks is adjusted.

The stuck sheet material manufacturing system equipped with the pressure device as specified in claim 2 of the present invention is advantageous in that the double faced corrugated fiberboard sheet can be surely pressurized by the plurality of weight blocks and a double faced corrugated fiberboard sheet having higher rigidity and quality can be manufactured. The system is also advantageous in that since a pressing force can be optionally adjusted during manufacturing of a double faced corrugated fiberboard sheet, corrugated fiberboard sheet base paper of various kinds can be processed.

According to claim 3 of the present invention, the stuck sheet material manufacturing system equipped with the pressure device as specified in at least one of claims 1 or 2 is characterized in that each of the elastic members includes a spring provided between the supporting member and each of the weight blocks and the weight blocks are respectively formed in long shapes so as to be extended in the traveling direction and arranged in parallel with the traveling direction.

A pressing force to be applied to the stuck sheet material is set according to a balance between the tensile force of the spring provided between the supporting member and each weight block and a force (pressurizing force) exerted in a vertical direction by the dead weight of each weight block. In particular, even when the heating device is deformed because of heat, pressing forces by the respective weight blocks are uniformly applied by the elongation and contraction function of the spring. Further, the postures of the plurality of weight blocks in the traveling direction can be stably maintained because of their long shapes extended in the traveling direction and their parallel arrangement in the traveling direction. Accordingly, the stuck sheet material is surely pressed and deformation of the weight blocks caused by heat transmitted from the heating member is reduced.

The stuck sheet material manufacturing system equipped with the pressure device as specified in claim 3 of the present invention is advantageous in that the bottom surfaces of the weight blocks can pressurize the stuck sheet material by approximately uniform pressing forces.

According to claim 4 of the present invention, the stuck sheet material manufacturing system equipped with the pressure device as specified in any one of claims 1 to 3 is characterized in that the pressure device includes a guiding member for regulating the movement of each weight block in the traveling direction and permitting its movement in up and down directions and its inclination in the horizontal direction.

The movement of the weight block in the traveling direction is regulated by the guiding member and thereby the dead weight of the weight block can be surely applied to the stuck sheet material. Further, since the movement of the weight block in the up and down directions and its inclination in the horizontal direction are permitted by the guiding member, a pressing force by the weight block can be uniformly applied to the stuck sheet material.

The stuck sheet material manufacturing system equipped with the pressure device as specified in claim 4 is advantageous in that the dead weight of the weight block can be surely applied as a pressing force because of the regulation of the movement of the weight block in the traveling direction by the guiding member and since the movement of the weight block in the up and down directions and its inclination in the horizontal direction are permitted, the stuck sheet material can be surely pressurized even when the heating member is deformed.

BRIEF DESCRIPTION OF THE DRAWINGS

FIG. 3(*b*) is a typical view showing the stuck sheet material manufacturing system equipped with the pressure device of the embodiment of the present invention, being a view showing an arrow indicated portion B of FIG. 2.

FIG. 5(*b*) is a side view illustrating an operation for adjusting a pressing force applied by a weight block in the stuck sheet material manufacturing system equipped with the pressure device of the embodiment of the present invention when a vertically moved plate is raised.

FIG. 5(*c*) is a side view illustrating an operation for adjusting a pressing force applied by a weight block in the stuck sheet material manufacturing system equipped with the pressure device of the embodiment of the present invention when a vertically moved plate is located in a highest position.

FIG. 10(*b*) is a diagrammatic view showing a sheet pressure withstanding crushing force for illustration of a problem inherent in the conventional pressure devide which employs the air pressurizing system.

FIG. 10(*c*) is a diagrammatic view showing a deformed condition of a pressure belt caused by application of air pressure for illustration of a problem inherent in the conventional pressure device which employs the air pressurizing system.

FIG. 12(*b*) is a diagrammatic view showing recessed deformation of a hot plate in a center of its breadth direction for illustration of a problem inherent in the conventional pressure device which employs the plate pressurizing system.

DETAILED DESCRIPTION OF THE PREFERRED EMBODIMENTS

The preferred embodiment of the present invention will now be described with reference to the accompanying drawings. FIGS. 1 to 6 each illustrates a pressure device arranged in a stuck sheet material manufacturing system according to an embodiment of the present invention.

The stuck sheet material manufacturing equipped with the pressure device of the embodiment has been designed to manufacture a stuck sheet material by sticking together a front sheet member and a back sheet member while traveling these members. This system includes a dry end which is composed of a single facer, a double facer, a slitter scorer cutoff stacker, and so on, and a loading part.

In the stuck sheet material manufacturing system equipped with the pressure devide of the embodiment, a single faced corrugated fiberboard sheet formed by the single facer and a liner are stuck together by the double facer so as to form a double faced corrugated fiberboard sheet, this double faced corrugated fiberboard sheet is cut by the dry end so as to form a divided plate-like double faced corrugated fiberboard sheet and this sheet is carried to the loading part.

The stuck sheet material manufacturing system equipped with the pressure device is also designed to make corrugated paper (i.e., double faced corrugated fiberboard and referred to as a corrugated fiberboard or a double, faced corrugated fiberboard sheet, hereinafter) by sticking together plural pieces of paper. This system will be described hereinbelow by being referred to as a double faced corrugated fiberboard sheet manufacturing device (referred to as a corrugating machine or a corrugator, hereinafter).

As described above, such a corrugating machine has a double facer arranged as a sticking device for sticking together a front sheet member and a back sheet member while traveling these members. In the case of the stuck sheet material manufacturing system equipped with the pressure device of the embodiment, however, the pressure device of its double facer has a special characteristic. Accordingly, this double facer will be described first.

Figure 8:
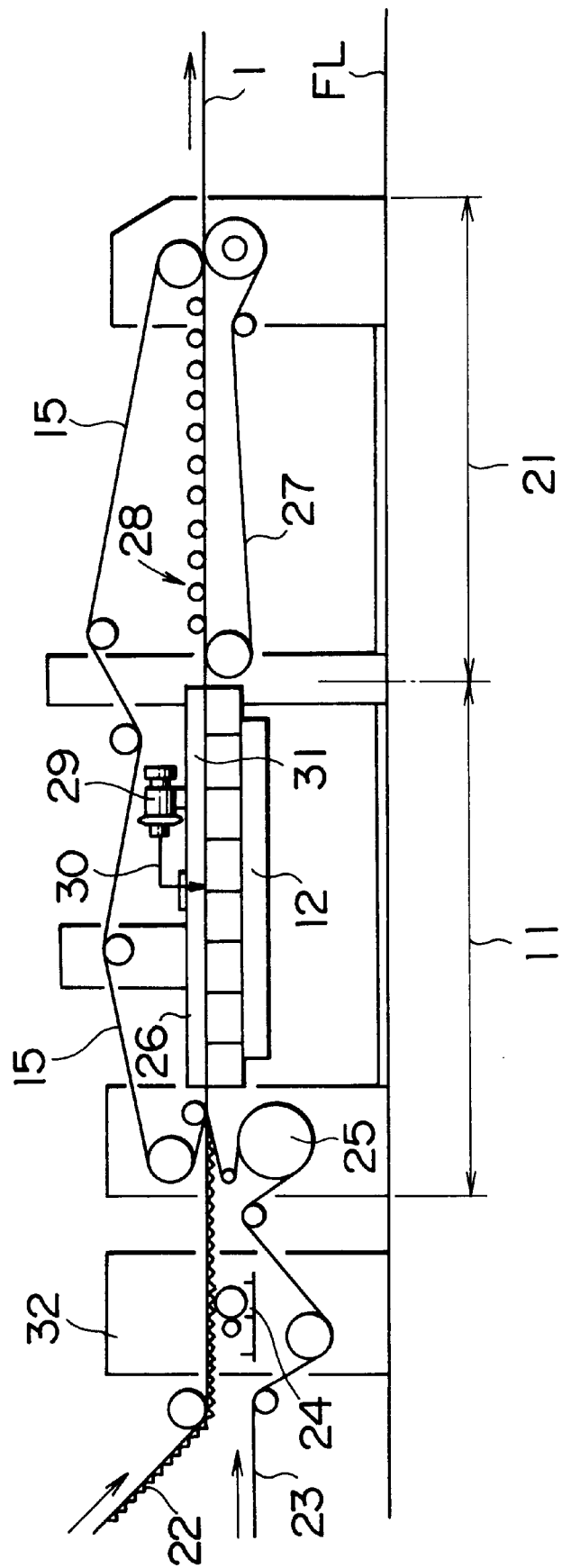
FIG. 8 is a typical side view showing an entire structure of a double facer arranged in a conventional corrugating machine.

As described above in the related art section (see FIG. 8), the double facer of the corrugating machine includes a heating part 11 and a cooling part 21. The double facer operates to make a double faced corrugated fiberboard sheet (or a double wall corrugated fiberboard sheet) 1 as a stuck sheet material by sticking together a single faced corrugated fiberboard sheet (back sheet member) 22, which is formed with the single facer (not shown) located in the upstream side of the double facer and glued by a gluing device 24, and a liner (front sheet member) 23 which is carried from a liner base paper feeding part (not shown).

The heating part 11 as one constitutional element of the double facer forms the double faced corrugated fiberboard sheet 1 by heating the single faced corrugated fiberboard sheet 22 and the liner 23 while applying pressure so as to adhere the sheet 22 and the liner 23 to each other. The heating part 11 includes a preheating part 25, a hot plate (heating box) 12 as a heating member, a pressure belt 15 and a later-described pressure device 50.

The single faced corrugated fiberboard sheet 22 and the liner 23 are then preheated and tempered by a preheating part 25 while being wound on a roller. The sheet 22 and the liner 23 are pressurized by the later-described pressure device 50 while being carried by the pressure belt (endless pressure belt) 15 arranged in the upper side of the heating part 11 oppositely to the hot plate (heating member) 12. Then, the sheet 22 and the liner 23 are pressed to the hot plate 12 arranged in the lower side of the heating part 11 and heated and thereby the double faced corrugated fiberboard 1 is formed.

The hot plate 12 is composed of a plurality of plate-like members which have been heated to a proper level by steam. The hot plate 12 heats the double faced corrugated fiberboard sheet 1 in contact with the liner 23 (back surface of the stuck sheet material) as one constitutional element of the double faced corrugated fiberboard sheet 1.

Figure 1:
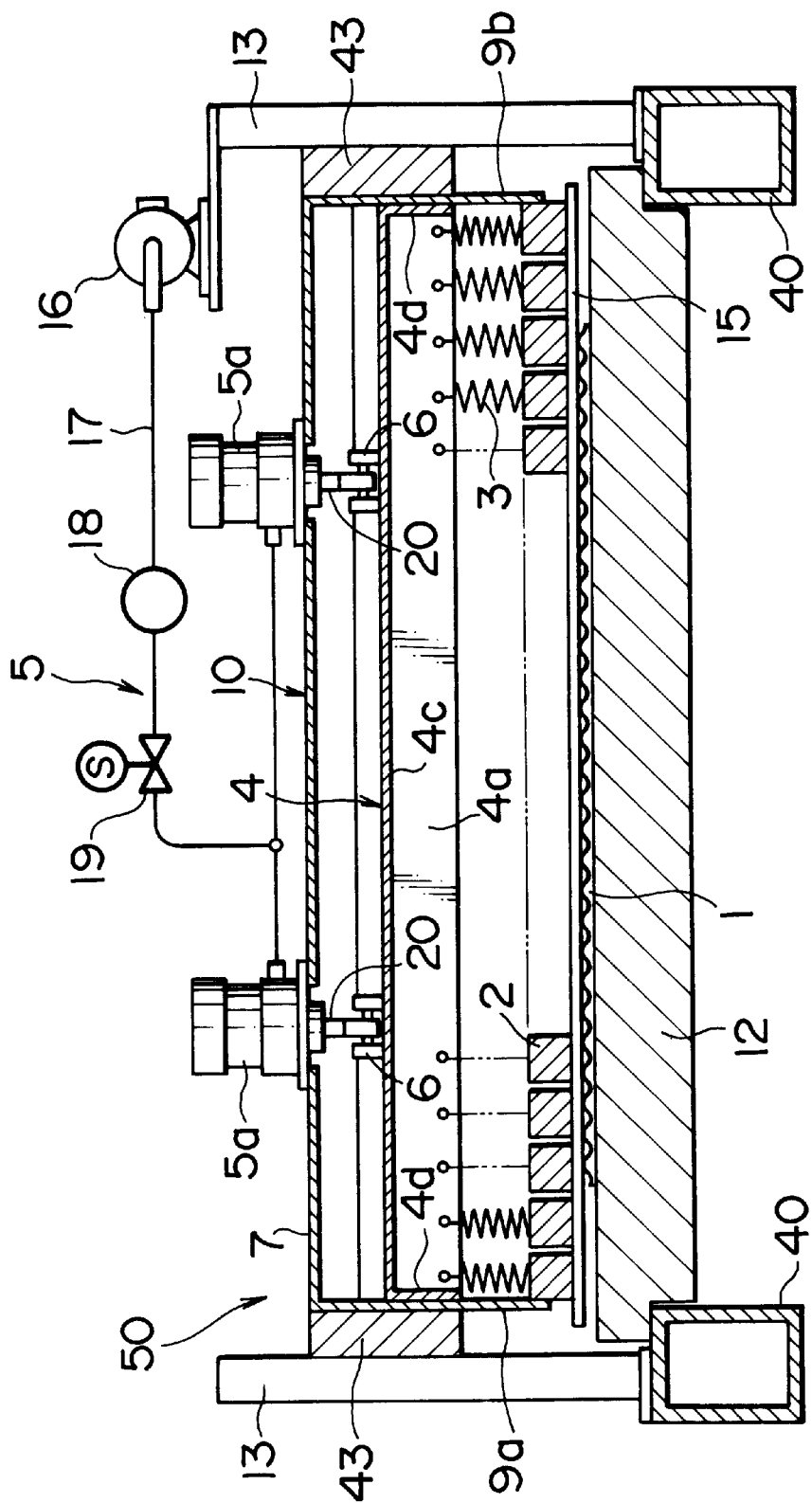
FIG. 1 is a typical front view showing a stuck sheet material manufacturing system equipped with a pressure device of an embodiment of the present invention, being a section view taken along an arrow indicated line C—C of FIG. 2.

As shown in FIG. 1, the hot plate 12 is attached onto main frames 40 arranged over the full length of a traveling direction in the lower sides of both side parts of the heating part 11. The main frames 40 are supported by struts, not shown.

The cooling part 21 as another constitutional element of the double facer has a function for securing a sticking condition between the single faced corrugated fiberboard sheet 22 and the liner 23 by cooling the double faced corrugated fiberboard sheet 1 made by the heating part 11 and a function for correcting distortion or warp during the cooling process. This cooling part 21 includes a carrier belt 27, a pressure belt 15, a pressurizing part 28, and so on. The double faced corrugated fiberboard sheet 1 is carried, being held between the carrier belt 27 arranged in the lower side of the cooling part 21 and the pressure belt 15 arranged in the upper side of the cooling part 21, and heated by the pressurizing part 28. The pressurizing part 28 includes a plurality of rollers and pressurizes the back surface of the pressure belt 15.

Next, the pressure device as a characteristic part of the stuck sheet material manufacturing system equipped with the pressure device of the embodiment will be described. FIG. 1 is a typical section view showing this pressure device.

As shown in FIG. 1, the pressure device 50 includes a vertically moved plate 4 as a supporting member, a plurality of weight blocks 2, a spring 3 as an elastic member provided between this vertically moved plate 4 and each of the weight blocks 2 and vertical movement driving means 5 for vertically moving the plate 4. This pressure device 50 is provided in an upper position so as to face the hot plate 12 as a heating member. The double faced corrugated fiberboard sheet 1 is pressed to the hot plate 12 and pressurized. Accordingly, the pressure device 50 can apply the vertical direction dead weight of each of the plurality of weight blocks 2 suspended from the vertically moved plate 4 via the spring 3 as a pressurizing force (pressing force) to the double faced corrugated fiberboard sheet 1.

Figure 2:
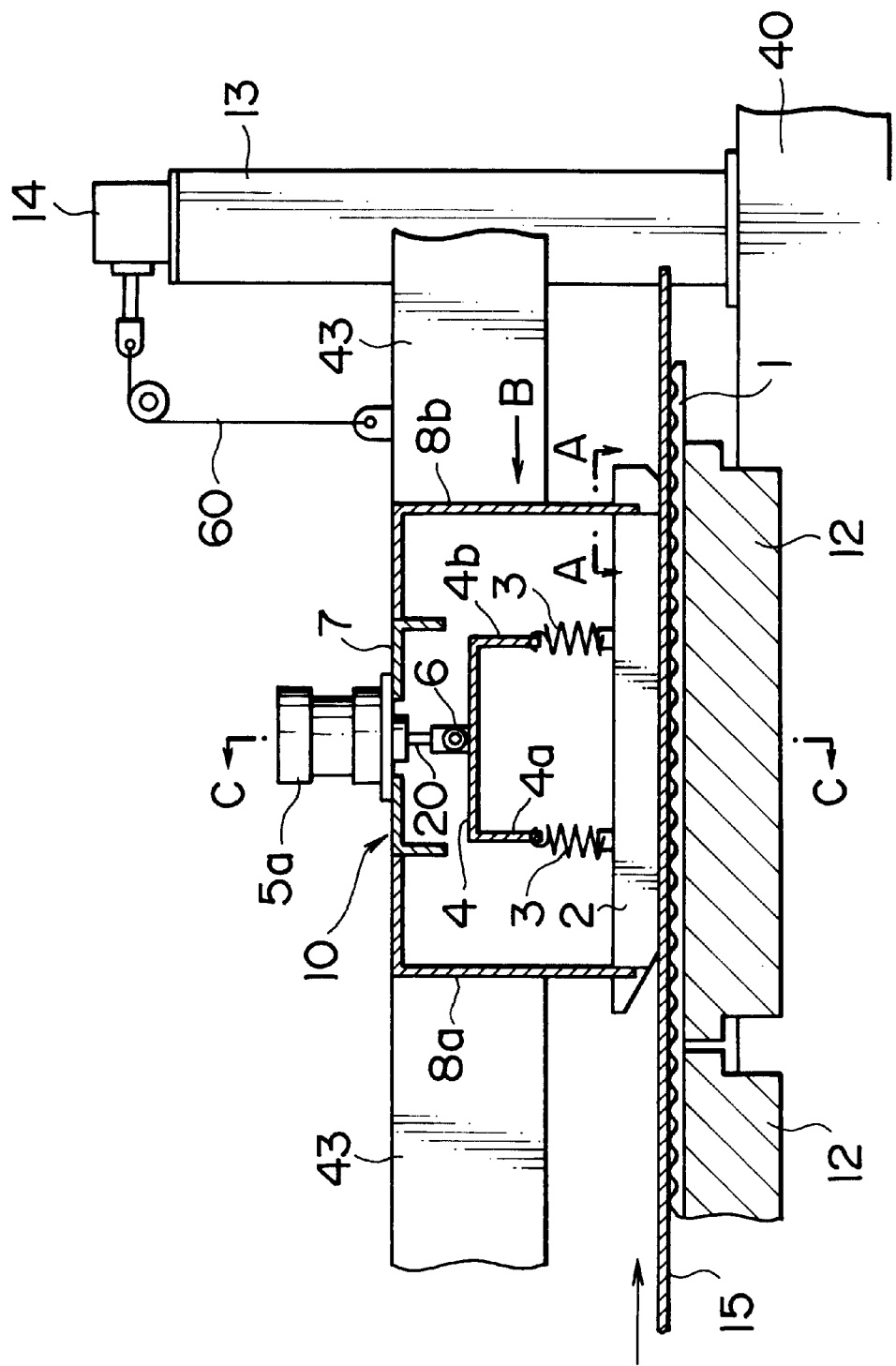
FIG. 2 is a typical side view showing the stuck sheet material manufacturing system equipped with the pressure device of the embodiment of the present invention.

As shown in FIG. 2, each of the plurality of weight blocks 2 is formed in a long shape so as to be extended in the traveling direction of the double faced corrugated fiberboard sheet 1. Its cross section is formed, as shown in FIG. 1, to be approximately square. The upstream side (left side of FIG. 2) of each weight block 2 in the traveling direction is formed to be wedge-like so as to facilitate traveling of the double faced corrugated fiberboard sheet 1.

The approximately square formation of the weight block 2 in its cross section is the result of an effort to reduce deformation caused by heat and prevent partial placing of an excessive load on both ends of the double faced corrugated fiberboard sheet 1 carried in a divided manner.

Figure 9:
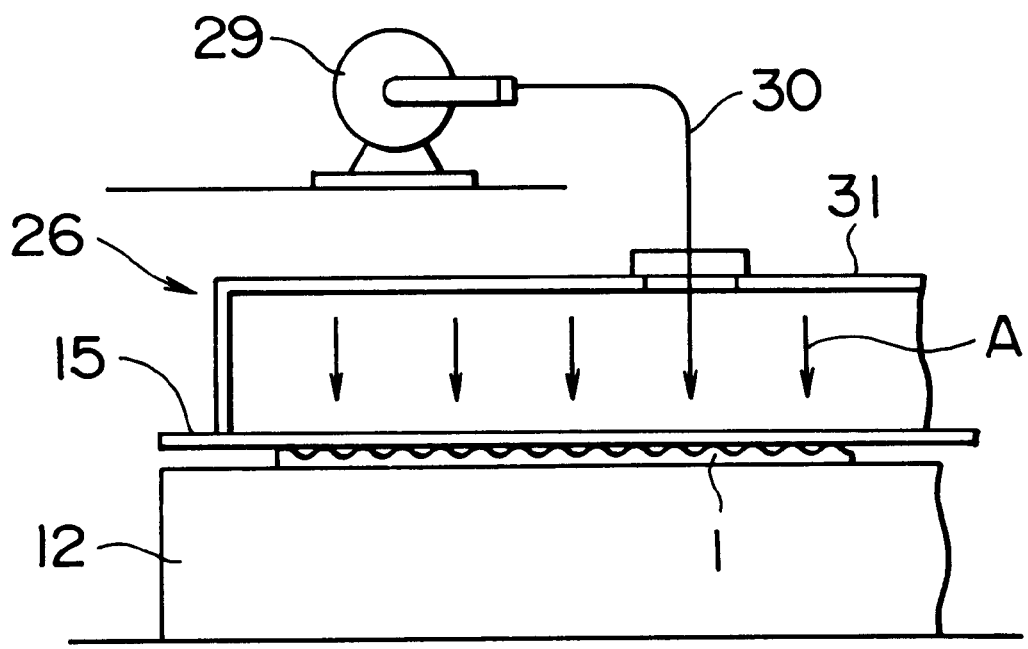
FIG. 9 is a typical front view showing a pressure device which employs an air pressurizing system and is arranged in the double facer of the conventional corrugating machine.
Figure 10A:
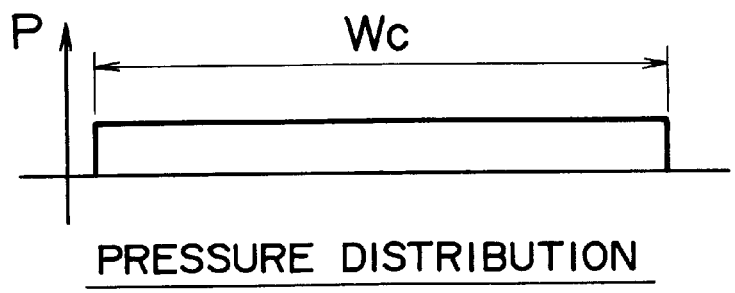
FIG. 10(*a*) is a diagrammatic view showing pressure distribution for illustration of a problem inherent in the conventional pressure device which employs the air pressurizing system.
Figure 10B:
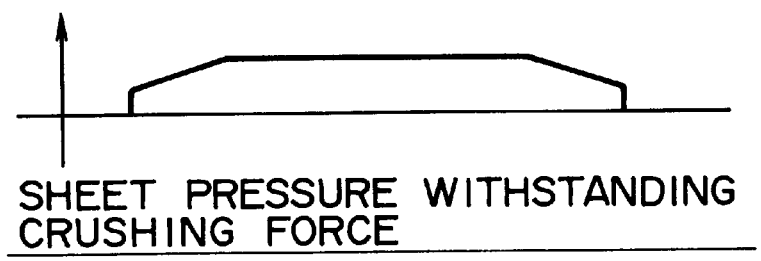
Figure 10C:
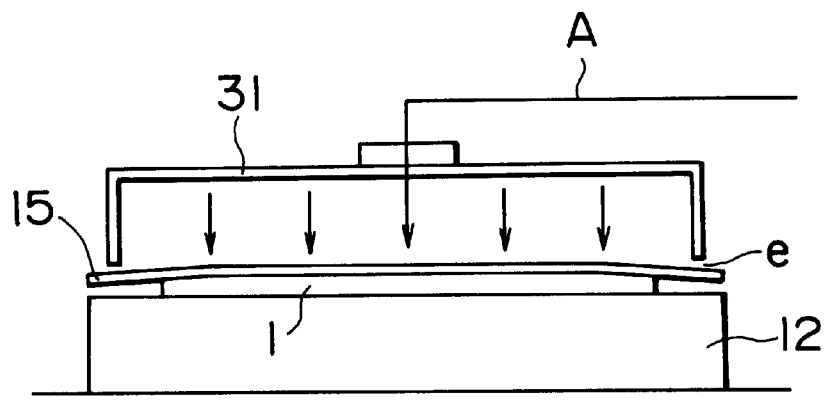
Figure 11:
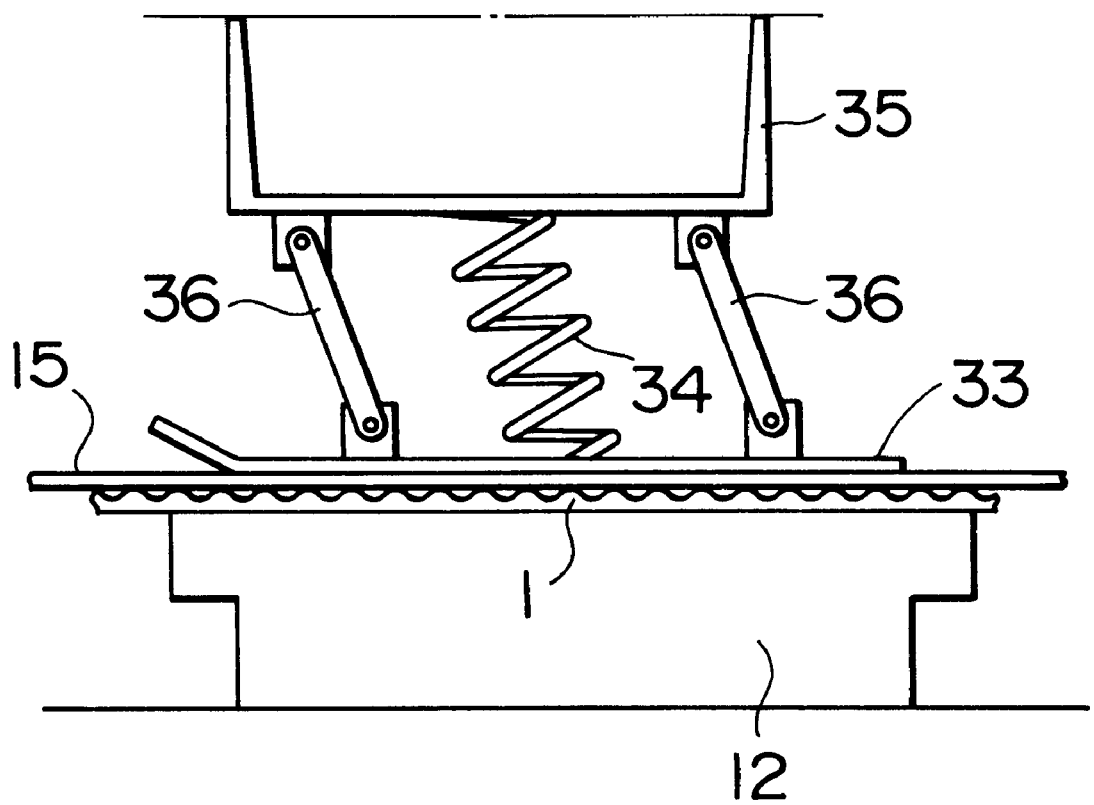
FIG. 11 a typical side view showing another pressure device which employs a plate pressurizing system and is arranged in the double facer of the conventional corrugating machine.
Figure 12A:
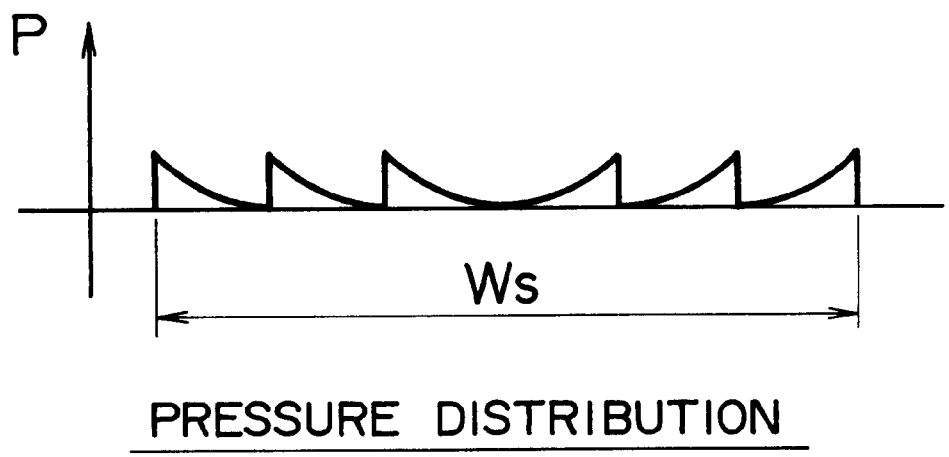
FIG. 12(*a*) is a diagrammatic view showing pressure distribution for illustration of a problem inherent in the conventional pressure device which employs the plate pressurizing system.
Figure 12B:
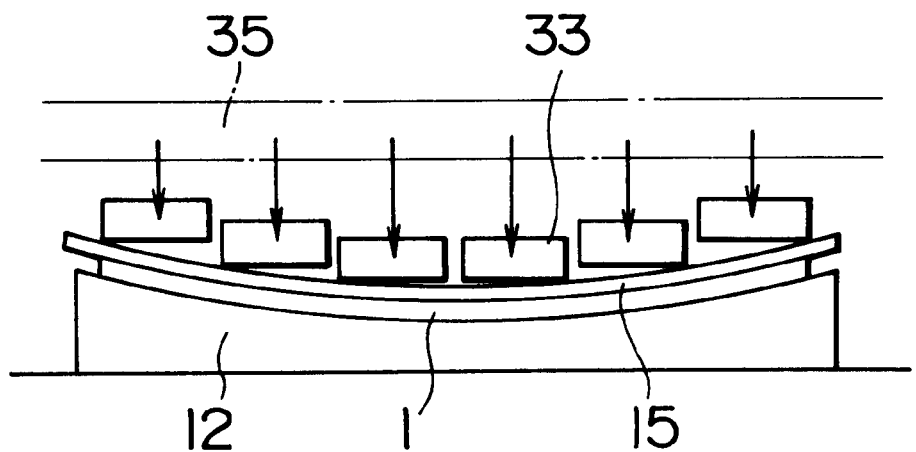

The weight block 2 may be formed to have a plate thickness of, for instance about 40 mm. The plate thickness of this level makes it possible to obtain pressure (pressurizing force) up to 300 Ag, which is necessary for making the double faced corrugated fiberboard sheet 1 by sticking together by a single faced corrugated fiberboard sheet and a liner in the air pressurizing system pressure device 50 described above in the related art section (see FIG. 9).

The pressure of about 300 Ag necessary for making the double faced corrugated fiberboard sheet 1 by sticking together the single faced corrugated fiberboard sheet and the liner is equivalent to a load of 300 kg/m². If the weight block 2 is made of steel, laying of this weight block 2 on the hot plate 12 results in 300 mm/7.8 (specific gravity)≈38 mm. Accordingly, the weight block 2 may be formed to have a plate thickness of about 40 mm.

The plurality of weight blocks 2 each of which is formed in the above-noted manner are arranged, as shown in FIG. 1, in parallel with the traveling direction of the double faced corrugated fiberboard sheet 1 (i.e., along the breadth direction of the double faced corrugated fiberboard sheet 1) and with a narrow space between each other so as to be suspended from the vertically moved plate 4 via the spring (tensile spring) 3. As shown in FIGS. 1 and 2, the weight blocks 2 pressurize the double faced corrugated fiberboard sheet 1 while being slid and brought into contact with back surface of the pressure belt 15 for carrying the double faced corrugated fiberboard sheet 1.

As shown in FIG. 2, the springs 3 are attached to two spots, that is, the upstream and downstream sides with respect to the traveling direction of each weight block 2, with a space between each other.

Each of these springs 3 is a coil spring and generates a force (tensile force) of a direction for pulling each weight block 2. A pressing force applied to the double faced corrugated fiberboard sheet 1 can be adjusted based on a balance between the vertical downward dead weight of the weight block 2 and the vertical upward tensile force of the spring 3.

As shown in FIG. 1, the vertically moved plate 4 is composed of spring attaching plate parts 4a and 4b, which are formed in the upstream and downstream sides with respect to the traveling direction of the double faced corrugated fiberboard sheet 1 so as to be extended in a horizontal direction perpendicular to the traveling direction, and connecting plate parts 4c and 4d for interconnecting these spring attaching plate parts 4a and 4b. A section of a direction perpendicular to the traveling direction of the double faced corrugated fiberboard sheet 1 is formed, as shown in FIG. 1, in a U shape facing downward. A section of a direction along the traveling direction of the double faced corrugated fiberboard sheet 1 is formed, as shown in FIG. 2, in a U shape facing downward.

The vertically moved plate 4 is attached to the vertical movement driving means 5, later described, via pins 6 so as to be freely swung. The pins 6 are attached to two left and right spots along the breadth direction of the double faced corrugated fiberboard sheet 1. The vertical movement driving means 5 is attached to a groove type side beam 7 formed in a groove shape. Accordingly, the vertical movement of the plate 4 is driven by the vertical movement driving means 5. In this case, the connecting plate parts 4a and 4d which constitute both side parts of the vertically moved plate 4 are arranged so as to be slid along and brought into contact with the inner side surfaces of side walls 9a and 9b fixed to the groove type side beam 7, later described.

The vertical movement driving means 5 vertically moves the plate 4 from which the plurality of weight blocks are suspended, and a tensile force of the spring 3 for lifting the weight block 2 is controlled by compressed air pressure added to an air cylinder 5a.

Figure 4:
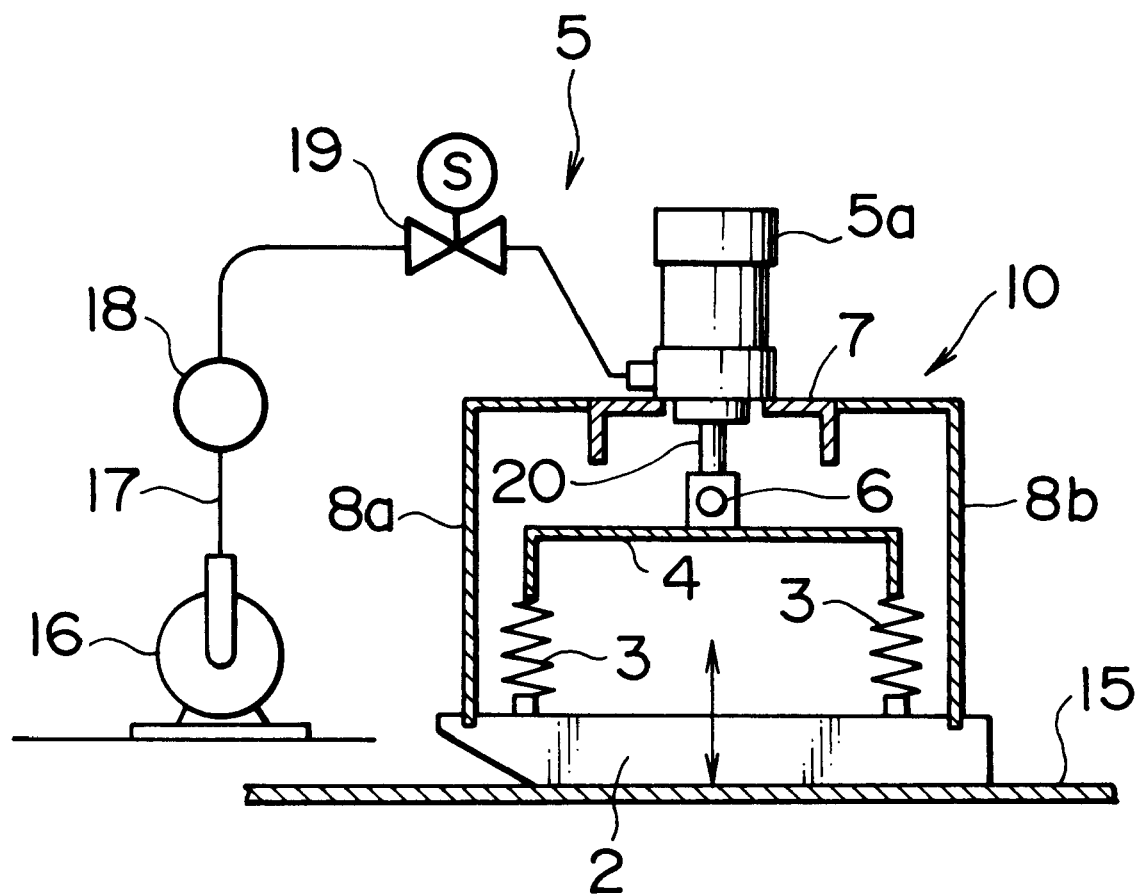
FIG. 4 is a typical side view showing vertical movement driving means of the stuck sheet material manufacturing system equipped with the pressure device of the embodiment of the present invention.

As shown in FIGS. 1 and 4, the vertical movement driving means 5 includes air cylinders 5a each having a rod 20 connected to the pin 6 attached to the vertically moved plate 4, a compressor (compressed air source) 16 for supplying compressed air to each of these single acting type air cylinders 5a and piping 17, a regulator 18 and a solenoid valve 19 arranged between the air cylinders 5a and the compressor 16.

The rod 20 in the air cylinder 5a is driven by supplying compressed air from the compressor 16 through the piping 17, and so on, to a chamber in the rod contraction side of the air cylinder 5a (i.e., a chamber in a side for raising the vertically moved plate 4) and thereby the plate 4 is vertically moved upward. In this case, the pressure of the compressed air supplied from the compressor 16 is adjusted by the regulator 18 and supplying of the compressed air is controlled by the solenoid valve 19.

The air cylinder 5a may be manually operated or automatically controlled by using a controller.

The height position of the weight block 2 is adjusted by the vertical movement driving means 5 and a pressing force applied to the double faced corrugated fiberboard sheet 1 is adjusted for the purpose of enabling a proper pressing force to be set according to a material which constitutes the double faced corrugated fiberboard sheet 1. Specifically, in the case of a soft sheet material, a low pressing force must be set because of a possibility of crushing the double faced corrugated fiberboard sheet 1. In the case of a highly rigid sheet material, a high pressing force must be set in order to secure sticking together between a single faced corrugated fiberboard sheet and a liner.

The vertical movement driving means 5 is fixed to the groove type side beam 7 and has two air cylinders 5a and 5a attached along the breadth direction of the groove type side beam 7 and with a space between each other.

The groove type side beam 7 to which the air cylinders 5a and 5a are attached will be described below.

As shown in FIG. 2, this groove type side beam 7 has front and rear walls (guiding members) 8a and 8b which are L-shaped in section and arranged in the forward and backward sides of the traveling direction.

Figure 3A:
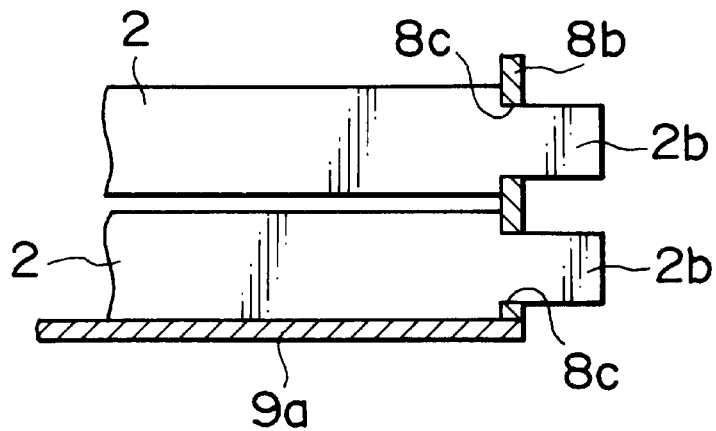
FIG. 3(*a*) is a typical view showing the stuck sheet material manufacturing system equipped with the pressure device of the embodiment of the present invention, being a section view taken along an arrow indicated line A—A of FIG. 2.
Figure 3B:
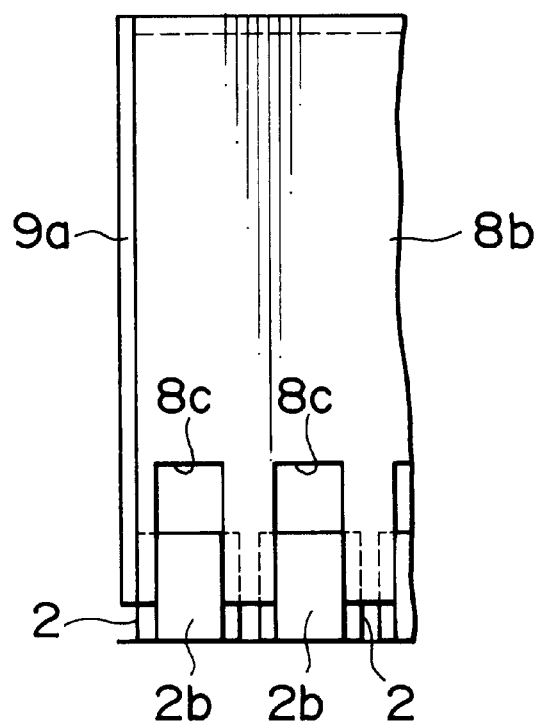

As shown in FIGS. 3(a) and 3(b), a plurality of comb-shape notched parts 8c are formed in the lower end of the rear wall 8b and the rear end 2b of the weight block 2 with its section reduced in the width direction is engaged with one of these notched parts 8c. FIGS. 3(a) and 3(b) each illustrates only the case of the notched part 8b. It should be understood, however, that a plurality of comb-shape notched parts 8d are similarly formed in the lower end of the front wall 8a and the front end 2a of the weight block 2 with its section reduced in the width direction is engaged with one of these notched parts 8d.

By this notched part 8c, the movement of the weight block 2 in the traveling direction is regulated while its movement in the up and down directions and its inclination in the horizontal direction are permitted.

The formation of the notched part 8c in the manner of permitting the weight block to move in the up and down directions facilitates the adjustment of a pressing force applied to the double faced corrugated fiberboard sheet 1. The formation of the notched part 8c in the manner of permitting the weight block to incline in the horizontal direction enables the weight block 2 to be uniformly pressed by inclining the same when the hot plate 12 as a pressurizing surface is deformed by heat or the like. The notched part 8c regulates horizontal shaking of the weight block 2 against the breadth direction of the double corrugated fiberboard 1 while permitting the same to incline in the horizontal direction.

As shown in FIG. 1, side walls 9a and 9b are fixed to both side parts of the front and rear walls 8a and 8b of the groove type side beam 7 by welding or the like. A pressurizing box 10 is composed of the groove type side beam 7, the side walls 9a and 9b and the front and rear walls 8a and 8b.

The side walls 9a and 9b regulates the movement of the pressurizing box 10 in the breadth direction. In this way, the movement of the weight block 2 in the breadth direction can be regulated.

As shown in FIGS. 1 and 2, movable frames 43 and 43 arranged approximately over the entire length of the heating part 11 are respectively attached to the side walls 9a and 9b as the constitutional elements of the pressuring box 10. Each of these movable frames 43 and 43 is suspended via a wire 60 from a lifting device 14 fixed to the upper part of a frame 13.

The weight block 2 provided in the pressurizing box 10 can be moved away from or brought into contact with the hot plate 12 by vertically moving the movable frame 43 with the lifting device 14 so as to move the pressurizing box 10 up and down. In this case, the movable frames 43 and 43 are arranged in such a manner that outer surfaces thereof are slid and brought into contact with the inner surfaces of the frames 13 and 13.

A plurality of lifting devices 14 are arranged along the traveling direction.

With the stuck sheet material manufacturing system equipped with the pressure device of the embodiment constructed in the foregoing manner, a stuck sheet material is manufactured while adjusting a pressurizing force in the pressure device in a manner described below.

Figure 5:
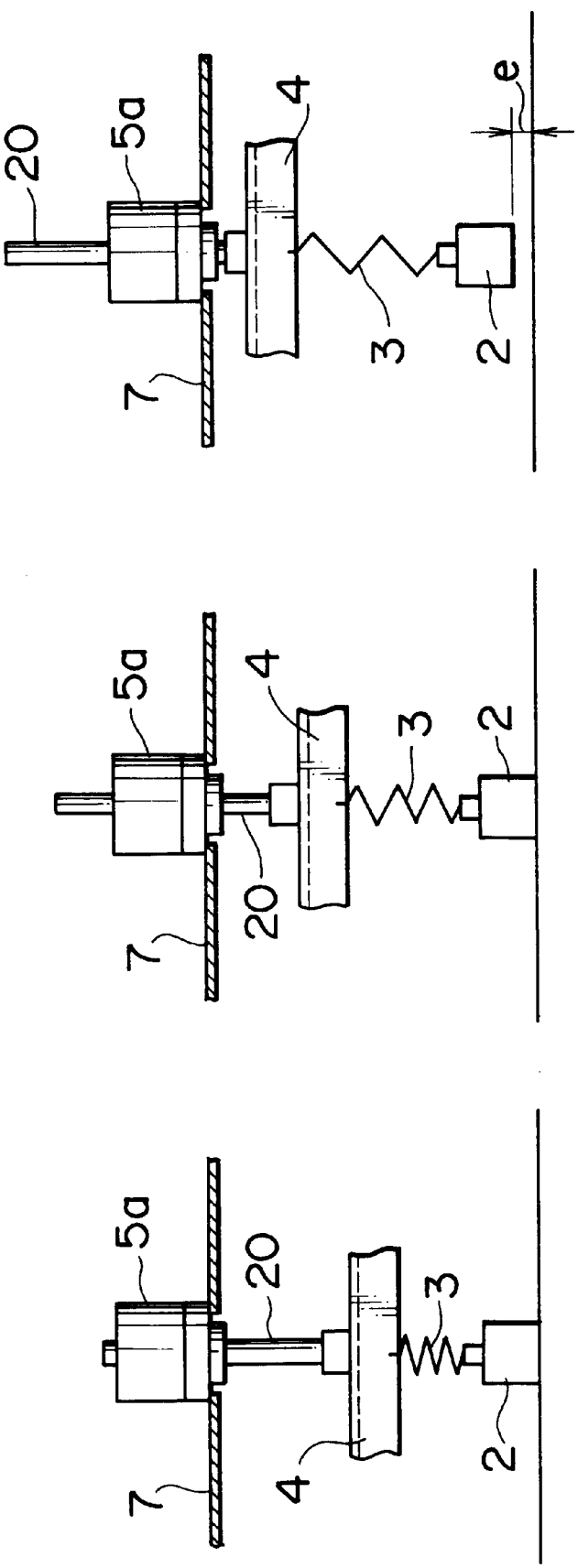
FIG. 5(*a*) is a side view illustrating an operation for adjusting a pressing force applied by a weight block in the stuck sheet material manufacturing system equipped with the pressure device of the embodiment of the present invention when a vertically moved plate is located in a lowest position.

As shown in FIG. 5(*c*), first, the vertically moved plate 4 is raised to an uppermost position by driving the vertical movement driving means 5 so as to raise the rod 20 of the air cylinder 5*a* and the pressurizing box 10 is raised to a specified position by the lifting device 14. Then, the weight block 2 is lifted by applying a tensile force of the spring 3 which is equivalent to a vertical downward force generated by the dead weight of the weight block 2.

In this way, a specified gap (e) is formed between the weight block 2 (pressure belt 15) and the hot plate 12. Accordingly, a single faced corrugated fiberboard sheet and a liner (i.e., double faced corrugated fiberboard sheet) can be carried to this gap (e). For cleaning work, and so on, of the upper surface of the hot plate 12, a space can be formed in a similar manner.

After the double faced corrugated fiberboard sheet 1 has been carried, a pressurizing force (sheet pressing force) is set to a level necessary for sticking of the double faced corrugated fiberboard sheet 1.

The process of setting this pressurizing force is as follows.

First, if the rigidity of the double faced corrugated fiberboard sheet 1 is high, the pressurizing box 10 is set to a specified height position by actuating the lifting device 4, and as shown in FIG. 5(*b*), air pressure supplied to the air cylinder 5*a* is reduced (or reduced to 0). Then, by lowering the vertically moved plate 4 to a lowermost position and reducing the tensile force of the spring 3 (or reducing the force to 0), the total dead weight of the weight block 2 is exerted on the back surface of the pressure belt 15.

Figure 6:
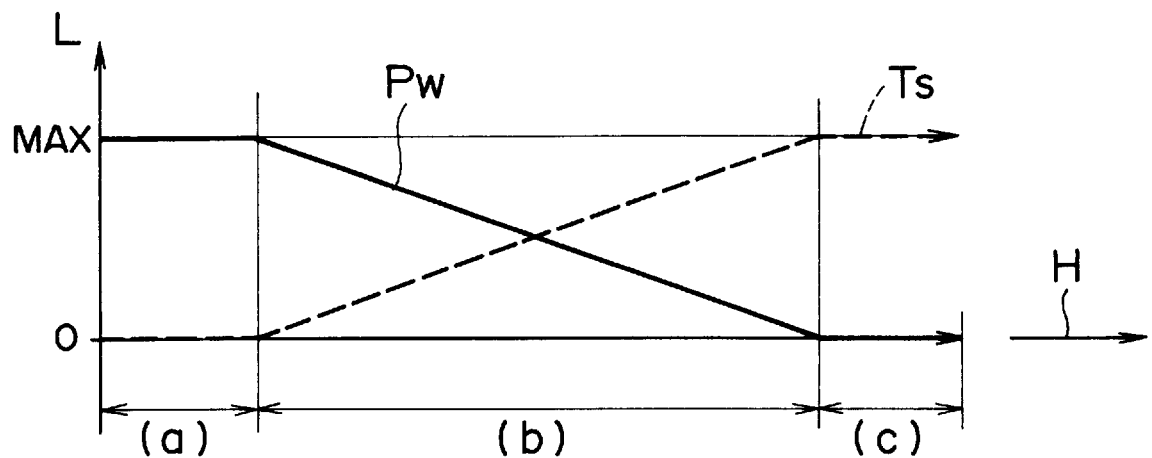
FIG. 6 is a diagrammatic view illustrating a relationship between a pressing force applied by a weight block and a tensile force of a spring (spring tension) in the stuck sheet material manufacturing system equipped with the pressure device of the embodiment of the present invention.

In this case, a pressing force Pw by the weight block 2 and a tensile force Ts (spring tensile force) by the spring 3 respectively take values within a region represented by (a) in FIG. 6. A load L (pressing force Pw by the weight block 2) applied on the double faced corrugated fiberboard sheet 1 is equal to the total dead weight of the weight block 2. FIG. 6 shows that the height H of the vertically moved plate 4 as a supporting member is gradually increased toward the right side [region (a) to region (c)].

The total weight of each of the pressure belt 15 and the weight block 2 is thus exerted on the highly rigid double faced corrugated fiberboard sheet 1. Accordingly, even the highly rigid double faced corrugated fiberboard sheet 1 is surely pressed and sticking together between the single faced corrugated fiberboard sheet and the liner is ensured.

On the other hand, if the rigidity of the double faced corrugated fiberboard sheet 1 is low, as shown in FIG. 5(*b*), by gradually increasing air pressure supplied to the air cylinder 5*a*, the vertically moved plate 4 is raised and a tensile force Ts by the spring 3 is increased. In this way, a vertical upward lifting force is gradually increased against the weight block 2. Accordingly, a pressing force applied to the double faced corrugated fiberboard sheet 1 by the weight block 2 is gradually reduced.

In this case, a pressing force Pw by the weight block 2 and a tensile force (spring tensile force Ts) by the spring 3 respectively take values within a region represented by (b) in FIG. 6. A load L (pressing force Pw by the weight block 2) applied on the double faced corrugated fiberboard sheet 1 takes a value which is obtained by subtracting the tensile force Ts of the spring 3 from the dead weight of the weight block 2.

Then, as shown in FIG. 5(*c*), by further increasing air pressure supplied to the air cylinder 5*a* so as to further raise the vertically moved plate 4, the tensile force Ts of the spring 3 is increased more. In this way, the tensile force Ts of the spring 3 is increased more than the dead weight of the weight block 2 and the weight block 2 is lifted some time later. Accordingly, by setting the pressing force Pw of the weight block 2 to 0, a pressing force to be applied to the double faced corrugated fiberboard sheet 1 can be limited only to the weight of the pressure belt 15.

In this case, a pressing force Pw by the weight block 2 and a tensile force Ts (spring tensile force) by the spring 3 respectively take values within a region represented by (c) in FIG. 6. A load L (pressing force Pw by the weight block 2) applied to the double faced corrugated fiberboard sheet 1 is 0.

Consequently, by increasing/decreasing air pressure supplied to the air cylinder 5*a*, a sheet pressing force Pw by the weight block 2 can be optionally changed within the range of the total weight of the weight block 2 to 0 and thus an optimal pressing force can be set.

The stuck sheet material manufacture pressure device of the embodiment of the present invention operated in the foregoing manner is advantageous in that the double faced corrugated fiberboard sheet 1 can be surely pressurized by using a dead weight always exerted vertically downward in each of the plurality of weight blocks 2.

The pressure device is also advantageous in that the increase/decrease of a pressing force generated by the dead weight of each of the weight blocks 2 can be adjusted by raising/lowering the vertically moved plate 4 having the plurality of weight blocks 2 with the vertical movement driving means 5, setting the position of each of the plurality of weight blocks 2 optionally in a vertical direction and adjusting the increase/decrease of an elastic force generated by the spring 3 which suspends each weight block 2.

The pressure device is further advantageous in that since the double faced corrugated fiberboard sheet 1 can be surely pressurized by the plurality of weight blocks 2, a highly rigid and high quality double faced corrugated fiberboard sheet 1 can be manufactured. The device is also advantageous in that since a pressing force can be optionally adjusted during manufacturing of the double faced corrugated fiberboard sheet 1, various pieces of corrugated fiberboard sheet base paper can be processed.

In particular, both width ends of the double faced corrugated fiberboard sheet 1 are not crushed and a well-flattened double faced corrugated fiberboard sheet 1 can be manufactured.

The pressure device is further advantageous in that the bottom surfaces of the plurality of weight blocks 2 can pressurize a stuck sheet material by approximately uniform pressing forces. In addition, the device enables a double faced corrugated fiberboard sheet 1 having a uniform sticking force over the sheet entire surface, that is, having high rigidity and quality, to be manufactured. By increasing a pressing force, a manufacturing speed, that is, productivity, can be greatly increased.

Since the movement of each of the weight blocks 2 in the traveling direction is regulated by the front and rear walls 8a and 8b as guiding members, the dead weight of the weight block 2 can be surely applied as a pressing force. The pressure device is also advantageous in that since the weight block 2 is permitted to move up and down and incline in the horizontal direction, the double faced corrugated fiberboard sheet 1 can be surely pressurized even when the hot plate 12 is deformed by heat.

Because of the small formation of the plurality of weight blocks 2 in the breadth direction of the device, deformation of each of the weight blocks 2 itself is reduced.

By providing a specified gap in the traveling direction of the double faced corrugated fiberboard sheet 1 and for instance, by providing a pressure device 50 for each hot plate 12, a dehydrating function (evaporation) for water remaining in the double faced corrugated fiberboard sheet 1 is improved and sheet distortion or warp can be prevented.

Furthermore, since the plurality of weight blocks 2 are suspended from the vertically moved plate 4 via the springs 3 and the plate 4 is supported by the vertical movement driving means 5 via the pin 6 so as to be rocked, the pressure device 50 in the stuck sheet material manufacturing system of the embodiment enables the front and rear sides of each of the weight blocks 2 to freely swing and move up and down and stably press the double faced corrugated fiberboard sheet 1 via the pressure belt 15 in accordance with the downward deformation of the hot plate 12.

Figure 7:
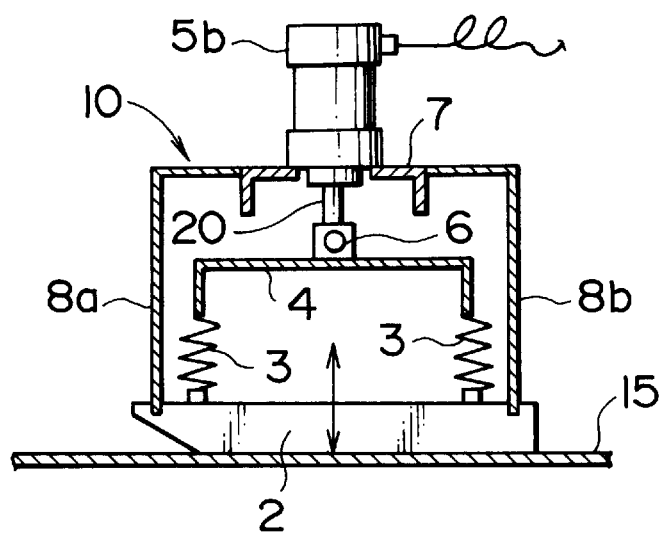
FIG. 7 is a typical side view showing a modified example of the vertical movement driving means of the stuck sheet material manufacturing system equipped with the pressure device of the embodiment of the present invention.

Next, a modified example of the stuck sheet material manufacturing system equipped with the pressure device of the embodiment of the present invention will be described. As shown in FIG. 7, this stuck sheet material manufacture pressure device has vertical movement driving means different from that of the embodiment.

Specifically, in the modified example, instead of the vertical movement driving means which is controlled by compressed air supplied to the air cylinder, vertical movement driving means which is controlled by a motor cylinder is used. By driving a motor cylinder 5b, the vertically moved plate 4 can be moved and set to a specified height position via the elongated/contracted rod 20.

The other constitutional elements of the modified example are similar to those of the embodiment and thus the description thereof will be omitted.

The stuck sheet material manufacturing system equipped with the pressure device of the modified example constructed in the above-noted manner provides effects similar to those provided by the system of the embodiment.

The vertical movement driving means of the modified example is manually operated by confirming the sticking condition of the double faced corrugated fiberboard sheet 1 by means of viewing. However, an encoder or other various means can be employed as a method for detecting a height position and automatic control can be performed by a controller.

As means for traveling and transferring a corrugated fiberboard sheet, an endless pressure belt can also be used on the surface of the corrugated fiberboard sheet as in the conventional case. However, the pressure belt can be omitted by employing a field roll. In this case, durability of each of used parts can be increased and maintenance, inspection and repairing can be facilitated.

In the stuck sheet material manufacturing system equipped with the pressure device of the embodiment, the air cylinder 5a of the vertical movement driving means 5 is a single acting type. However, the cylinder to be used is not limited to this type. Other types, for instance the type which controls a piston position by supplying compressed air to both chambers of the air cylinder and based on a pressure balance, may be used.

In addition, the constitution of each of the vertical movement driving means 5 for the vertically moved plate 4 and the lifting device 14 of the pressurizing box 10 in the stuck sheet material manufacturing system equipped with the pressure device of the embodiment is not limited to that described above. Constitution of other various kinds may be used.

Furthermore, in the stuck sheet material manufacturing system equipped with the pressure device of the embodiment, the plurality of weight blocks 2 are suspended by the springs (coil springs) 3 as elastic members. However, other kinds of springs, or rubber may be used.

What is claimed is:

1. A stuck sheet material manufacturing system equipped with a pressure device for manufacturing a stuck sheet material comprising:

a sticking device for sticking together a front sheet member and a rear sheet member while moving said members through said system, wherein said sticking device includes a heating member for heating a sheet member in contact with at least one of front and rear surfaces of said stuck sheet material and a pressure device provided opposite said heating member for pressing said stuck sheet material to said heating member, and said pressure device includes a supporting member arranged so as to be extended in a horizontal direction perpendicular to a traveling direction, a plurality of weight blocks, each block suspended from said supporting member via an elastic member generating an elastic force, said blocks arranged side by side, each said elastomeric member having a first end connected to a respective wight block and an opposite end connected to said supporting member, and vertical movement driving means for driving a vertical movement of said supporting member to determine a mounting height of said opposite ends of said elastic members, whereby the elastic force generated by said elastic members and applied to respective blocks is set and pressing force applied to said stuck sheet material is selected.

2. A stuck sheet material manufacturing system equipped with a pressure device as claimed in claim 1, wherein said sticking device includes a double facer for forming a double faced corrugated fiberboard sheet as said stuck sheet material.

3. A stuck sheet material manufacturing system equipped with a pressure device as claimed in claim 1, wherein each of said elastic member includes a spring provided between said supporting member and each of said weight blocks, and said plurality of weight blocks are formed in a long shape so as to be extended in said traveling direction and provided in parallel with said traveling direction.

4. A stuck sheet material manufacturing system equipped with a pressure device as claimed in claim 1, wherein said pressure device includes a guiding member for regulating movement of each of said weight blocks in said traveling direction and permitting movement in up and down directions and inclination in said horizontal direction.

5. A stuck sheet material manufacturing system equipped with a pressure device as claimed in claim 2, wherein each of said elastic member includes a spring provided between said supporting member and each of said weight blocks, and said plurality of weight blocks are formed in a long shape so as to be extended in said traveling direction and provided in parallel with said traveling direction.

6. A stuck sheet material manufacturing system equipped with a pressure device as claimed in claim 2, wherein said pressure device includes a guiding member for regulating movement of each of said weight blocks in said traveling direction and permitting movement in up and down directions and inclination in said horizontal direction.

7. A stuck sheet material manufacturing system equipped with a pressure device as claimed in claim 3, wherein said pressure device includes a guiding member for regulating movement of each of said weight blocks in said traveling direction and permitting movement in up and down directions and inclination in said horizontal direction.

8. The stuck sheet material manufacturing system of claim 4 further comprising a beam extending in the horizontal direction and fixed to said vertical movement driving means and wherein said guiding member comprises front and rear walls fixed to opposite sides of said beam in the direction of travel, each said wall comprising notches for surrounding said weight blocks.

9. The stuck sheet material manufacturing system of claim 6 further comprising a beam extending in the horizontal direction and fixed to said vertical movement driving means and wherein said guiding member comprises front and rear walls fixed to opposite sides of said beam in the direction of travel, each said wall comprising notches for surrounding said weight blocks.

10. The stuck sheet material manufacturing system of claim 7 further comprising a beam extending in the horizontal direction and fixed to said vertical movement driving means and wherein said guiding member comprises front and rear walls fixed to opposite sides of said beam in the direction of travel, each said wall comprising notches for surrounding said weight blocks.

* * * * *